US012092054B1

(12) United States Patent
Dyson

(10) Patent No.: US 12,092,054 B1
(45) Date of Patent: Sep. 17, 2024

(54) COMBINED BRAYTON AND STIRLING CYCLE POWER GENERATOR

(71) Applicant: United States of America as represented by the Administrator of NASA, Washington, DC (US)

(72) Inventor: Rodger W. Dyson, Cleveland, OH (US)

(73) Assignee: United States Government Administrator of NASA, Washington, DC (US)

( * ) Notice: Subject to any disclaimer, the term of this patent is extended or adjusted under 35 U.S.C. 154(b) by 0 days.

(21) Appl. No.: 18/313,500

(22) Filed: May 8, 2023

Related U.S. Application Data

(60) Provisional application No. 63/364,294, filed on May 6, 2022.

(51) Int. Cl.
*F02G 5/02* (2006.01)

(52) U.S. Cl.
CPC ............ *F02G 5/02* (2013.01); *F02G 2243/00* (2013.01); *F02G 2250/03* (2013.01)

(58) Field of Classification Search
CPC ..... F02G 5/02; F02G 2243/00; F02G 2250/03
See application file for complete search history.

(56) References Cited

U.S. PATENT DOCUMENTS

| | | | | |
|---|---|---|---|---|
| 4,199,945 | A * | 4/1980 | Finkelstein | F02G 1/0435 60/520 |
| 5,456,076 | A * | 10/1995 | Zornes | F02G 1/044 91/218 |
| 9,664,181 | B2 * | 5/2017 | Steiner | F03G 7/002 |
| 10,495,355 | B2 * | 12/2019 | Fukaya | F03G 7/0252 |
| 10,507,934 | B1 * | 12/2019 | Dyson, Jr. | B64D 37/34 |
| 2013/0092350 | A1 * | 4/2013 | N. | F01D 5/084 165/51 |
| 2018/0363564 | A1 * | 12/2018 | Geneste | H02K 7/1823 |

* cited by examiner

*Primary Examiner* — Jesse S Bogue
(74) *Attorney, Agent, or Firm* — Robert H. Earp, III; Mark Wolfgang; Trenton J. Roche

(57) ABSTRACT

A system is described which includes a Brayton cycle engine having a compressor, a turbine, a hollow rotating shaft that extends between a first end and a second end, a hollow tubing that interconnects the first end and the second end, and a heat source; a thermoacoustic Stirling cycle engine disposed within the hollow rotating shaft between the first and second ends thereof, the Stirling cycle engine including a cold side heat exchanger disposed adjacent to the compressor, a hot side heat exchanger disposed adjacent to the turbine, and a regenerator disposed between the cold and hot side heat exchangers; a first power generator disposed within the hollow tubing and located adjacent to the second end of the hollow rotating shaft; and, a second power generator disposed around the hollow rotating shaft between the first and second ends. The system can be arranged in a quad configuration having four stages.

20 Claims, 13 Drawing Sheets

COMBINED BRAYTON AND STIRLING CYCLE POWER GENERATOR

CROSS-REFERENCE TO RELATED APPLICATIONS

This application claims priority to and the benefit of the following U.S. Provisional Patent Application Ser. No. 63/364,294, filed May 6, 2022 and entitled "NO MAINTENANCE, LIGHT-WEIGHT, HIGH-EFFICIENCY, CLOSED STRAYTON CYCLE POWER GENERATOR FOR THE CHALLENGING 50 kW TO 500 kW APPLICATIONS." The application listed above is hereby incorporated by reference in its entirety.

BACKGROUND OF THE INVENTION

The Brayton thermodynamic cycle is commonly used in a variety of applications including aircraft turbofan propulsion, terrestrial power generation, and space power generation because it can scale to large power levels. The Brayton cycle can be recuperated or non-recuperated and can be open cycle or closed cycle. Normally, the Brayton cycle efficiency increases as the compressor pressure ratio increases, but for a given temperature ratio, the specific power begins to decrease with additional pressure ratio growth. This is because the turbine temperature limits prevent the addition of more thermal energy. If the turbine blade can be cooled, both higher efficiency and higher specific power can be achieved. Historically, open Brayton cycles have out-performed closed Brayton cycles because of the difficulty of cooling the turbine blade and the additional mass of heat exchanger recuperation. Closed cycle Brayton efficiency is a function of compressor pressure and temperature ratio, but also of the mass and effectiveness of the recuperator. In all cases, a higher turbine inlet temperature reduces system mass and increases both system efficiency and system specific power.

The Stirling cycle is widely used in lower power applications that require high thermal efficiency. Generally, the Stirling cycle is a closed cycle that does not scale well to higher power because of oscillating component amplitude and thermal surface heat transfer limits. The thermoacoustic Stirling cycle either generates a sound wave with thermal input, or it can operate in reverse to provide refrigeration using the energy from an incoming acoustic wave. The acoustic wave can generate electric power by either extracting the pressure wave with an oscillating piston, or for higher power levels, it can extract the velocity wave with a generator. While the acoustic Stirling cycle and piston Stirling cycle have comparable efficiencies, the acoustic Stirling cycle can operate over a larger range of temperature ratios and power levels when appropriately configured.

SUMMARY OF THE INVENTION

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

In one embodiment, a system includes a Brayton cycle engine having a compressor, a turbine, a hollow rotating shaft that extends between a first end and a second end, a hollow tubing that interconnects the first end and the second end, and a heat source. The system further includes a thermoacoustic Stirling cycle engine disposed within the hollow rotating shaft between the first and second ends thereof. The Stirling cycle engine includes a cold side heat exchanger disposed adjacent to the compressor, a hot side heat exchanger disposed adjacent to the turbine, and a regenerator disposed between the cold and hot side heat exchangers. A first power generator is disposed within the hollow tubing and located adjacent to the second end of the hollow rotating shaft. A second power generator is disposed around the hollow rotating shaft between the compressor and the turbine.

In another embodiment, a system includes a four-stage engine, wherein each stage is interconnected by a first hollow tubing and each stage includes a Brayton cycle engine that includes a compressor, a turbine, a hollow rotating shaft that extends between a first end and a second end, and a heat source. The system further includes a thermoacoustic Stirling cycle engine disposed within the hollow rotating shaft between the first and second ends thereof. The Stirling cycle engine includes a cold side heat exchanger disposed adjacent to the compressor, a hot side heat exchanger disposed adjacent to the turbine, and a regenerator disposed between the cold and hot side heat exchangers. A first power generator is disposed within the first hollow tubing and located adjacent to the second end of the hollow rotating shaft. Additionally, a second power generator disposed around the hollow rotating shaft between the compressor and the turbine.

In yet another embodiment, a system includes a four-stage engine, wherein a first hollow tubing connects each stage and each stage is arranged at our about 90 degrees apart from an adjacent stage. Each stage includes a Brayton cycle engine that includes a compressor, a turbine, a hollow rotating shaft that extends between a first end and a second end, and a heat source. A thermoacoustic Stirling cycle engine is disposed within the hollow rotating shaft between the first and second ends thereof. The Stirling cycle engine includes a cold side heat exchanger disposed adjacent to the compressor, a hot side heat exchanger disposed adjacent to the turbine, and a regenerator disposed between the cold and hot side heat exchangers. A first power generator is disposed within the first hollow tubing and located adjacent to the second end of the hollow rotating shaft. A second power generator is disposed around the hollow rotating shaft between the compressor and the turbine. A four-stage intercooling level fluidically is connected to and disposed under the four-stage engine, each stage comprising an intercooling acoustic heat exchanger being arranged at or about 90 degrees apart from an intercooling acoustic heat exchanger of an adjacent stage. Each stage is interconnected by a second hollow tubing having a four-stage reheating level fluidically connected to and disposed above the four-stage engine. Each stage comprises a reheating acoustic heat exchanger being arranged at or about 90 degrees apart from a reheating acoustic heat exchanger of an adjacent stage. Each stage is connected by a third hollow tubing. Additionally, a recuperator is centrally located with respect to the four-stage engine, the four-stage intercooling level, and the four-stage reheating level.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

The embodiments set forth in the drawings are illustrative and examples in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As described herein, embodiments of disclosure are directed to a Brayton cycle and an acoustic Stirling cycle being combined into a new, synergistic cycle engine referred to herein as a "Strayton" engine or generator. Since each of the Brayton and Stirling cycles act as a topping cycle and bottoming cycle to the other, a unique thermodynamic combined cycle property is provided which otherwise is not possible. Normally, a first cycle is the topping cycle, and a second cycle is the bottoming cycle (such as, for example, a gas turbine Brayton engine acting as a topping cycle for a steam turbine Rankine engine which acts as the bottoming cycle, or a fuel cell acting as the topping cycle with a Stirling engine acting as the bottoming cycle). The unique Strayton cycle of the disclosure forms the basic building block for other configurations described herein.

Figure 1:
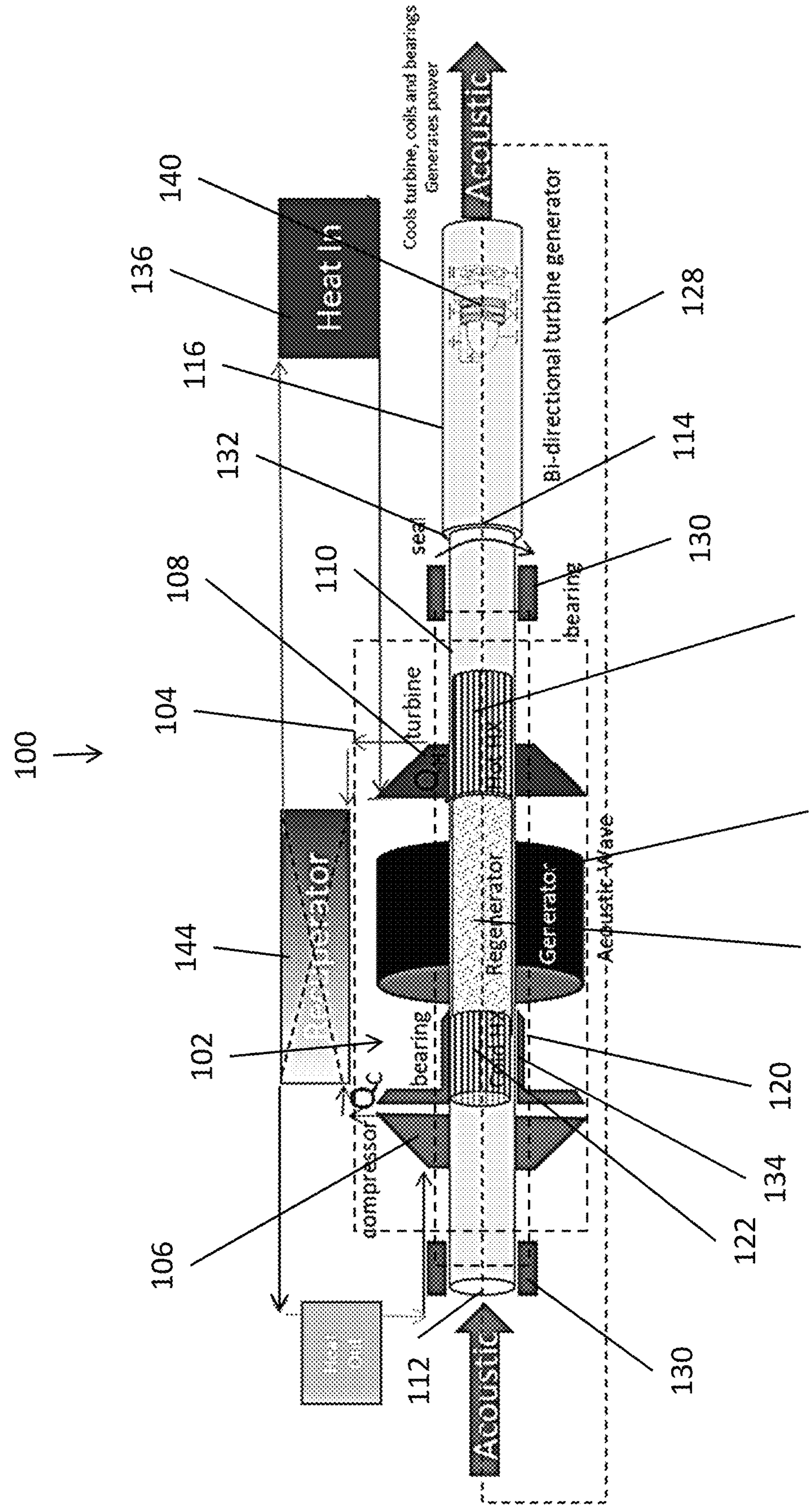
FIG. 1 depicts a schematic view of an embodiment directed to a combined Brayton cycle engine and Stirling cycle engine, according to one or more embodiments described and illustrated herein.

Turning now to FIG. 1, an example thermal energy conversion power generation system 100 is schematically depicted in accordance with embodiments of the disclosure. The thermal energy conversion power generation system 100 can be an open or closed system. The power generation system 100 includes at least one engine 102, which is a combined Brayton and Stirling cycle engine referred to herein as a "Strayton" engine or generator.

The Strayton engine 102 generally includes a Brayton cycle engine 104 and a thermoacoustic Stirling engine 120 embedded within the Brayton cycle engine 104. In particular, the Brayton engine 104 generally includes a compressor 106, a turbine 108, a hollow rotating shaft 110 extending between a first end 112 and a second end 114, and a heat source 136. The first and second ends 112, 114 of the hollow rotating shaft 110 are interconnected by hollow tubing 116 to form a self-amplifying acoustic loop 128.

The Stirling engine 120 is disposed within the hollow rotating shaft 110 between the first and second ends 112, 114 thereof. The Stirling engine 120 generally includes a cold side heat exchanger 122 disposed adjacent to the compressor 106, a hot side heat exchanger disposed adjacent to the turbine 108, and a regenerator 126 disposed between the cold and hot side heat exchangers 122, 124. Each of the cold and hot side heat exchangers 122, 124 and regenerator 126 are located within the hollow rotating shaft 110.

During operation of the example thermal energy conversion power generation system 100, a heat source 136 supplies heat to the turbine 108. Heat transfer rate $Q_H$ is drawn down through the blades of the turbine 108 and is used to power the Stirling cycle engine 120. In other words, the hot side heat exchanger 124 receives heat generated from the turbine 108 to thereby power the Stirling cycle engine 120. In this regard, the Stirling cycle engine 120 provides conductive cooling of the turbine 108. That is, pulling heat down through the blades of the turbine 108 has a cooling effect on the structure of the Strayton engine 102, thereby allowing the system 100 to reduce or remove turbine blade cooling flow. Overall, the waste heat generated from the Brayton cycle engine 104 acts as a topping cycle delivering thermal energy to the Stirling cycle engine 120 embedded within the hollow rotating shaft 110. In other words, the Brayton cycle engine 104 powers the Stirling cycle engine 120.

A recuperator 144 can be included to transfer some of the waste heat from the exhaust of the turbine 108 to the compressed air of the compressor 106. However, it is noted that the Stirling cycle engine 120 also provides thermal recuperation for the Brayton cycle engine 104. In this regard, using the cold side heat exchanger 122, wasted thermal power Qc from the Stirling cycle engine 120 is introduced to the Brayton cycle engine 104, directly before combustion at heat source 136, through a thrust bearing 134 that is paired with the cold side heat exchanger 122. As a result, the overall efficiency of the Brayton cycle engine 104 is increased. In other words, the waste heat generated from the thermoacoustic Stirling cycle engine 120 is transferred to the cold side heat exchanger 122 to create a recuperation cycle within the Brayton cycle engine 104, thereby increasing overall efficiency.

The thermal energy conversion power generation system 100 further includes a first power generator 140 disposed within the hollow tubing 116 and located adjacent to the second and 114 of the hollow rotating shaft 110. The first power generator 140 is configured to harness thermal acoustic energy from the loop 128 generated by the Stirling engine 120 and generate electric power therefrom. In some embodiments, the first power generator 140 is a bi-directional turbine generator which, when combined with the thermoacoustic Stirling engine 120 described herein, can operate over a large range of temperature ratios and power levels. The Stirling cycle engine 120 acts to amplify incoming power by approximately 1:3. Therefore, for example, if a 1 HP acoustic wave is input, 3 HP would be available for electric power generation with the first power generator 140. In this fashion, acoustic waves are generated on the cold end (i.e., the first end 112 adjacent to the cold side heat exchanger 122) via a no moving part standing wave thermoacoustic generator (not shown), which then activates the first power generator 140 disposed within hollow tubing 116 and located adjacent to the second end 114 of hollow rotating shaft 110. It is noted that multiple of the individual Strayton engine 102 illustrated in FIG. 1 can be arranged into a quad configuration as further discussed below. When in the quad configuration, the acoustic wave is a traveling wave that does not require a thermoacoustic standing wave generator or resonator. Rather, the traveling wave is amplified repeatedly as it travels around the loop formed by the quad configuration until the maximum power is reached. The maximum power is limited by the maximum heat the heat exchangers can transfer.

A second power generator 142 is disposed around the hollow rotating shaft 110. In some embodiments, the second power generator 142 is located between the compressor 106 and the turbine 108. However, in other embodiments, it should be understood that the second power generator 142 could be located anywhere between the first and second ends 112, 114 of the hollow rotating shaft 110, such as between the compressor 106 and the first end 112 of the hollow rotating shaft 110. The second power generator 142 is configured to harness rotational energy from the hollow rotating shaft 110 and generate electric power therefrom. In some embodiments, the second power generator 142 is a permanent magnet generator. In some other embodiments, the second power generator 142 is a three-phase switched reluctance ("SR") generator. SR generators are mechanically capable of very high-speed operation due to their simple and robust rotor construction without embedded permanent magnets or electrical windings. Moreover, SR generators are capable of high-temperature (e.g., above 300° C.) operation. As a result, SR generators are particularly suited to handle the high speed of the hollow rotating shaft 110 and the high temperatures associated with the Strayton engine 102.

Bearings 130 are included to rotationally support the hollow rotating shaft 110. In some embodiments, the bearings 130 are pressurized gas bearings for long lasting, no maintenance operation. The use of pressurized gas bearings also enables zero greenhouse gas emissions because no oil particulates are released into the atmosphere (forming contrails) from oil bearings which would otherwise be used. Additional pressurized gas bearings (not shown) can be used to rotationally support the first power generator 140 within the hollow rotating shaft 110. Moreover, the hollow rotating shaft 110 of the Brayton cycle engine 104 is separated from the non-rotating structures (e.g., hollow tubing 116) of the Stirling cycle engine 120 by a clearance seal 132. The clearance seal 132 is hermetically sealed from the environment but intentionally has a leakage path between the Brayton and Stirling cycles. As a result, the Brayton and Stirling cycle engines 104, 120 effectively share the same pressurized working fluid.

The pressurized working fluid in a closed Strayton generator system, such as Strayton generator 102, increases the system specific power by reducing the size of the compressor 106 and turbine 108, by increasing the rotational speed of the hollow rotating shaft 110, which reduces the required size of the second power generator 142 when a SR generator is used, and by increasing the efficiency of the first power generator 140 when a bi-directional turbine generator is used. In some embodiments, the pressurized working fluid used in the closed Strayton generator system, such as Strayton generator 102, can be a noble gas. In some particular embodiments, the pressurized working fluid can be selected from HeXe, HeAr, or $HeN_2$.

It is noted that using the same pressurized, high molecular weight working fluid benefits both the Brayton cycle engine 104 and the Stirling cycle engine 120, but for different reasons. For the Brayton cycle engine 104, it reduces the required size of the compressor 106, turbine 108 and second power generator 142 by increasing the rotational speed. In other words, the inert high pressure, high molecular weight working fluid (e.g., He—Ar) makes the turbomachinery small enough to be cooled conductively. For the Stirling cycle engine 120, it increases the efficiency of the first power generator 140 (e.g., about 90% efficiency) when an acoustic bi-directional turbine is used. As a result, the Strayton engine 102 has a higher overall specific power and efficiency compared to a Brayton or Stirling cycle engine alone.

Moreover, the unique Strayton engine 102 provides many benefits in both open and closed systems, such as increased Brayton cycle 104 efficiency due to a higher turbine inlet temperature achieved via conductive cooling of the turbine from the embedded acoustic Stirling cycle 120. Brayton cycle 104 efficiency is further increased because the embedded acoustic Stirling cycle 120 provides for higher thermal recuperation with thermal transfer from the turbine 108 to the compressor 106 exhaust. In addition, the overall system efficiency is higher because of the reciprocal thermoacoustic topping and bottoming cycles of the Brayton cycle engine 104 and Stirling cycle engine 120. Furthermore, the heat transfer provided by the embedded acoustic Stirling cycle 120 allows the size of heat exchangers to be reduced. Moreover, thermoacoustic cooling provided by the embedded Stirling cycle 120 can be used to refrigerate the power generators 140, 142, bearings 130, and electronics which may be included in the system.

Additional benefits are realized through use of the example Strayton engine 102 in a closed cycle. For instance, separation of the heat source 136 from the turbine inlet fluid enables the use of a nuclear, solar, or combustible heat sources and further protects turbine blades from combustion products, reactivity, and creep. In addition, the use of higher-pressure working fluids achieves higher specific power at any altitude. Furthermore, bearings 130 can be pressurized gas bearings that support high-speed, no-maintenance shafts (e.g., hollow rotating shaft 110) which reduces the overall mass of the turbomachinery and generator. Additionally, higher temperature turbine blades can be used which otherwise could not be used in a closed system due to limited blade cooling options and refractory coating limitations.

Moreover, significant performance gains are realized due to the following unique features of the Strayton engine 102. First, the ability to cool the turbine blades conductively with the embedded thermodynamic Stirling cycle 120 enables operating the Brayton cycle 104 at a higher compression ratio and hence a higher efficiency. Second, the waste heat from cooling the turbine blades and rejected heat exhaust from the turbine 108 are used to power the Stirling engine 120 embedded within the hollow rotating shaft 110 (thereby acting as a bottoming cycle). Third, the rejected heat from the embedded Stirling engine 120 is used to heat the compressed Brayton working fluid (thereby acting as a recuperator and a topping cycle for the Brayton engine 104) and as such, the Brayton engine 104 and embedded Stirling engine 120 mutually serve as topping and bottoming cycles at the same time for maximum system efficiency. Fourth, by closing the entire system into a hermetically sealed unit, the working fluid of the Brayton and Stirling cycles 104, 120 can be pressurized to increase the specific power, resulting in a reduction of the turbine diameter to 4 inches or less at a megawatt scale, making the system a highly effective conductive heat transfer component for both cooling of the turbine 108 and heating of the compressor 106 outlet. Fifth, normally a closed Brayton cycle requires a very large recuperator that dominates the mass of the entire system, but the embedded Stirling cycle 120 naturally provides recuperation when it acoustically transfers the waste heat from the turbine end to the compressor end. As such, a smaller recuperator 144 can be used. Sixth, no gearbox is required because the rotational speed of the hollow rotating shaft 110 can be perfectly matched with the required generator speeds (due to the sealed working fluid and pressure tuning thereof). Seventh, the sealed system is perfectly quiet. Eighth, relaxed tolerances can be used because the dual topping/bottoming cycle synergy reduces the need for separate high efficiency components (one cycle's loss is the other cycle's gain), thereby reducing manufacturing costs. Ninth, the hermetically sealed Brayton and Stirling cycles 104, 120 enable the use of inert working fluids (typically noble gases) to eliminate corrosion. Tenth, the noble gas working fluids enables higher operating temperatures because they don't corrode like super-critical $CO_2$ at temperatures greater than 923K. Moreover, the noble gas working fluids are more compatible with higher temperature refractory turbine blades, and when combined with the embedded conductive cooling of the Stirling cycle 120, turbine 108 inlet temperatures of greater than 1500K are potentially possible resulting in even higher efficiency. Eleventh, the super-critical $CO_2$ heat rejection constraint (critical point temperature of about 310K) requires large heat exchangers, but noble gases can reject at higher temperatures, which is useful for heat exchanger mass rejection in aeronautical and space applications. Twelfth, the example Strayton engine 102 has natural momentum cancelling and a compact size enabled by eliminating an external recuperator and corresponding plumbing. Thirteenth, the example Strayton engine 102 is heat source agnostic, which enables zero-emission or sustainable fuels to be used for aircraft and nuclear sources in terrestrial and space applications. Fourteenth, the inert working fluid does not require the very high pressures required by super-critical $CO_2$ (i.e., 2 MPa vs. 25 MPa), thereby reducing system mass. Fifteenth, the entire system is hermetically sealed with no moving external seals. Sixteenth, the pressurized working fluid enables long life gas bearings 130 that are non-contact, rotating, oscillating, and that require no lubrication.

Figure 2A:
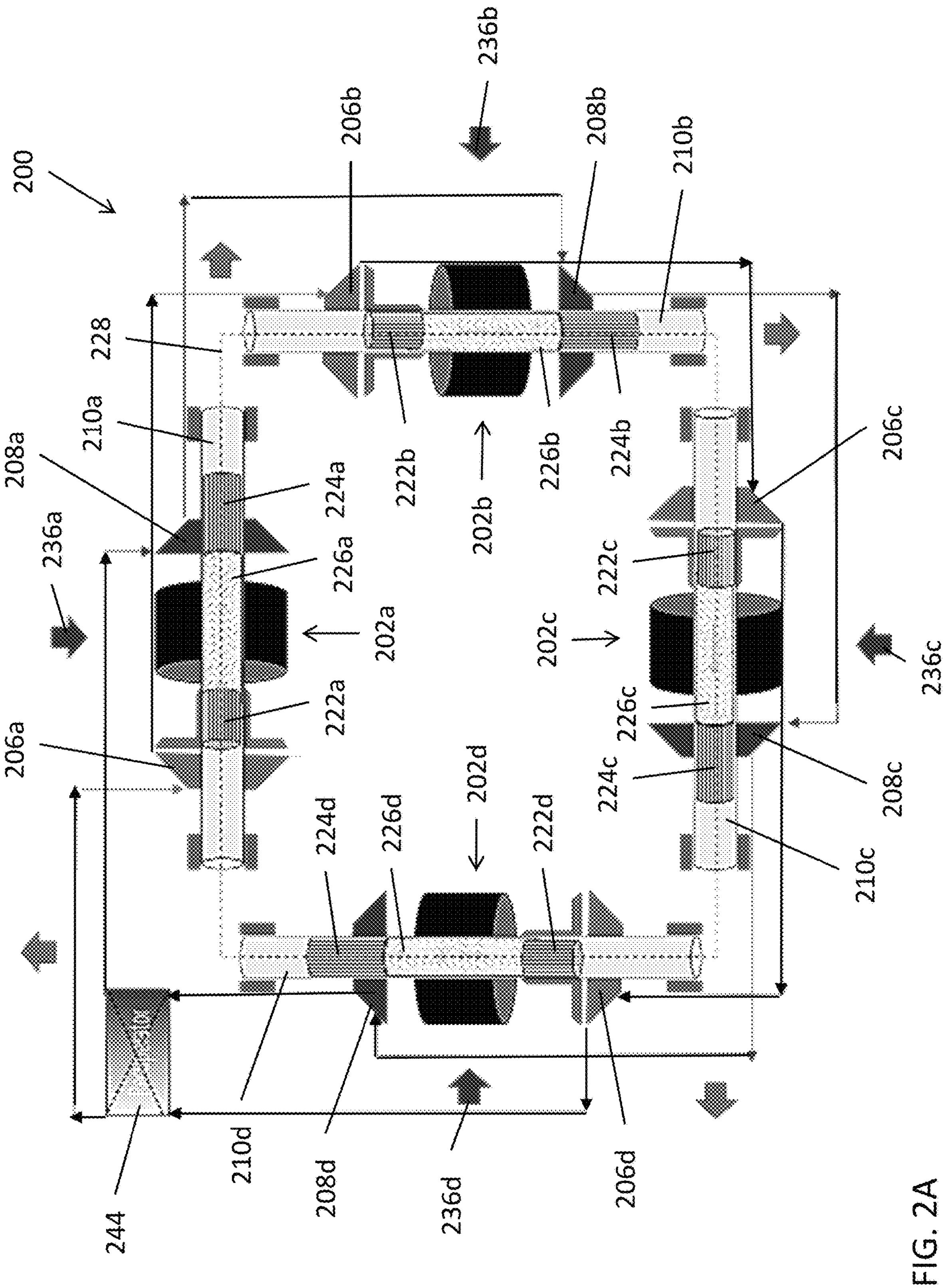
FIG. 2A depicts a schematic view of an embodiment directed to a four-stage combined Brayton cycle engine and Stirling cycle engine where the stages are arranged in a quad configuration, according to one or more embodiments described and illustrated herein.
Figure 2B:
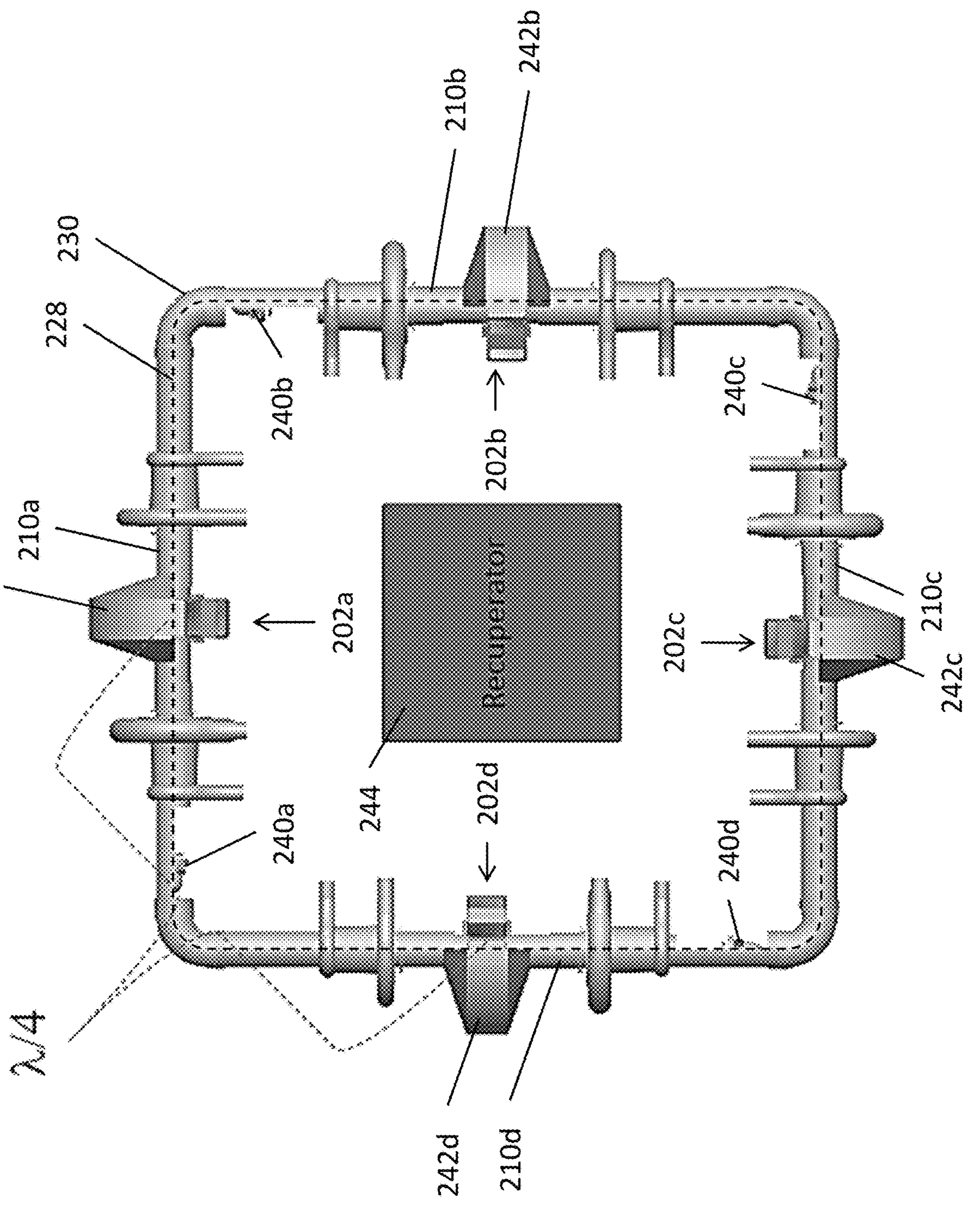
FIG. 2B depicts a top view of the four-stage combined Brayton cycle engine and Stirling cycle engine of FIG. 2A.

These unique benefits and performance gains are further realized by combining multiple of the above-described Strayton cycles together in staged system 200 as shown in FIGS. 2A and 2B. For example, system 200 includes four Strayton cycle engines or stages 202*a*-202*d* which are schematically depicted in a closed quad configuration. The quad configuration enables 90-degree acoustic wavelength separation between the acoustic Stirling regenerators of each Strayton cycle engine 202*a*-202*d*. Moreover, the quad configuration enables optimal multi-stage inter-cooling compression and reheating turbine expansion with a single recuperator.

It should be understood that each Strayton engine 202*a*-202*d* includes components similar to the at least one Strayton engine 102 described above and illustrated in FIG. 1. Thus, each Strayton engine 202*a*-202*d* generally includes a Brayton cycle engine and an acoustic Stirling cycle engine embedded within the Brayton cycle engine.

In particular, with reference to FIG. 2A, each of the Strayton engines 202*a*-202*d* include a Brayton cycle engine which is generally made up of compressors 206*a*-206*d* and turbines 208*a*-208*d*. Each of the Strayton engines 202*a*-202*d* also include an acoustic Stirling cycle engine which is generally made up of cold side heat exchangers 222*a*-222*d*, hot side heat exchangers 224*a*-224*d*, and regenerators 226*a*-226*d* embedded within hollow rotating shafts 210*a*-210*d*, respectively. Heat sources 236*a*-236*d*, such as combustors, are also included. In addition, the staged system 200 utilizes a single recuperator 244. With reference to FIG. 2B, the staged system also includes first power generators 240*a*-240*d* disposed within hollow tubing 230, and second power generators 242*a*-242*d* disposed around hollow rotating shafts 210*a*-210*d*, respectively. Clearance seals (not shown but discussed above) are located at the interface of the hollow rotating shafts 210*a*-210*d* and hollow tubing 230.

As shown in FIG. 2B, the four Strayton engines 202*a*-202*d* are placed ¼ wavelength apart to form the quad configuration having a self-amplifying acoustic loop 228. In other words, each acoustic Stirling engine of the four Strayton engines 202*a*-202*d* are placed acoustically 90 degrees apart from an adjacent Stirling engine, such that each regenerator 226*a*-226*d* is separated by 25% of the total wavelength of the acoustic wave. Moreover, the four Strayton engines 202*a*-202*d* are interconnected by hollow tubing 230 through which the acoustic energy can travel in the loop 228. The acoustic energy in the loop 228 can be used to generate electricity with bi-directional turbine generators (e.g., first power generators 240*a*-240*d* from FIG. 1) and/or it can be used to provide cooling of the Brayton cycle engine or to power electronics and other components.

Figure 2C:
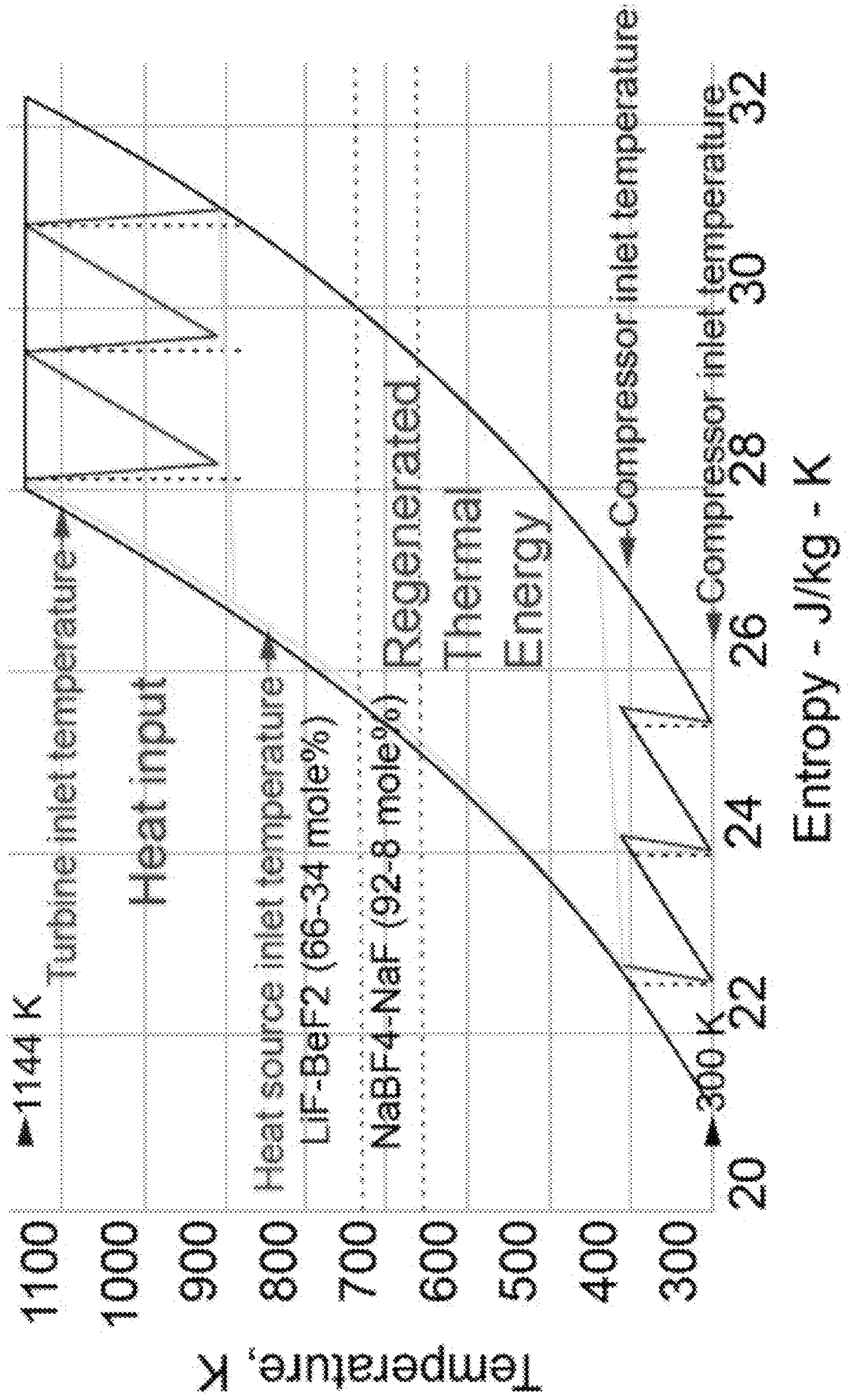
FIG. 2C depicts a Temperature vs. Entropy diagram showing the improved efficiency provided by the four-stage combined Brayton cycle engine and Stirling cycle engine of FIG. 2A.

For example, during operation of the four Strayton engines 202*a*-202*d* in FIG. 2A, intercooling is provided between each compressor 206*a*-206*d* and reheating is provided between each turbine 208*a*-208*d*. The purpose of this quad arrangement is two-fold. First, as shown in FIG. 2B, the quad configuration enables the four regenerators 226*a*-226*d* to be located acoustically ¼ wavelength apart to achieve a higher specific power for the Stirling cycle engines without the complication of mechanical linkages. Second, the compressor inter-stage cooling between compressors 206*a*-206*d* and the reheating between turbines 208*a*-208*d* at all four stages improves the efficiency of the Brayton cycle engines, as shown by the Temperature vs. Entropy diagram in FIG. 2C. It is noted that FIG. 2C only illustrates three stages with inter-cooling and reheating. However, the same benefits apply independent of the number of stages. Moreover, only a single recuperator 244 is required.

In some embodiments, each the four Strayton engines 202*a*-202*d* can generate about 2.5 MW of power. As such, the quad configuration of the four Strayton engines 202*a*-202*d* can generate a total of about 10 MW of power. However, these levels of power generation are only examples, and it should be understood that each of the four Strayton engines 202*a*-202*d* individually or in the quad configuration can operate at lower power levels as desired.

In some embodiments, the staged system 200 having the quad configuration of Strayton engines 202*a*-202*d* in FIGS. 2A and 2B can be included as part of a multi-level stacked system 300, as illustrated in FIGS. 3A-3F. The multi-level stacked system 300 includes a bottom intercooling level or stage 302, a middle level or stage 304 (e.g., the staged Strayton system 200 including the four Strayton cycle engines 202*a*-202*d* arranged in a quad configuration from FIGS. 2A-2B), and a top reheating level or stage 306. Thus, multi-level stacked system 300 has three acoustic Stirling loops with four acoustic Stirling engines in each loop. The loop of the top reheating level 306 generates acoustic power from waste heat produced during reheating of the turbine inlets. The loop of the middle level 304 generates acoustic power from the turbine cooling waste heat. The loop of the middle level 304 also provides turbine to compressor outlet recuperation. The loop of the bottom intercooling level 302 generates acoustic power from waste heat produced during intercooling of the compressor stages.

Figure 3A:
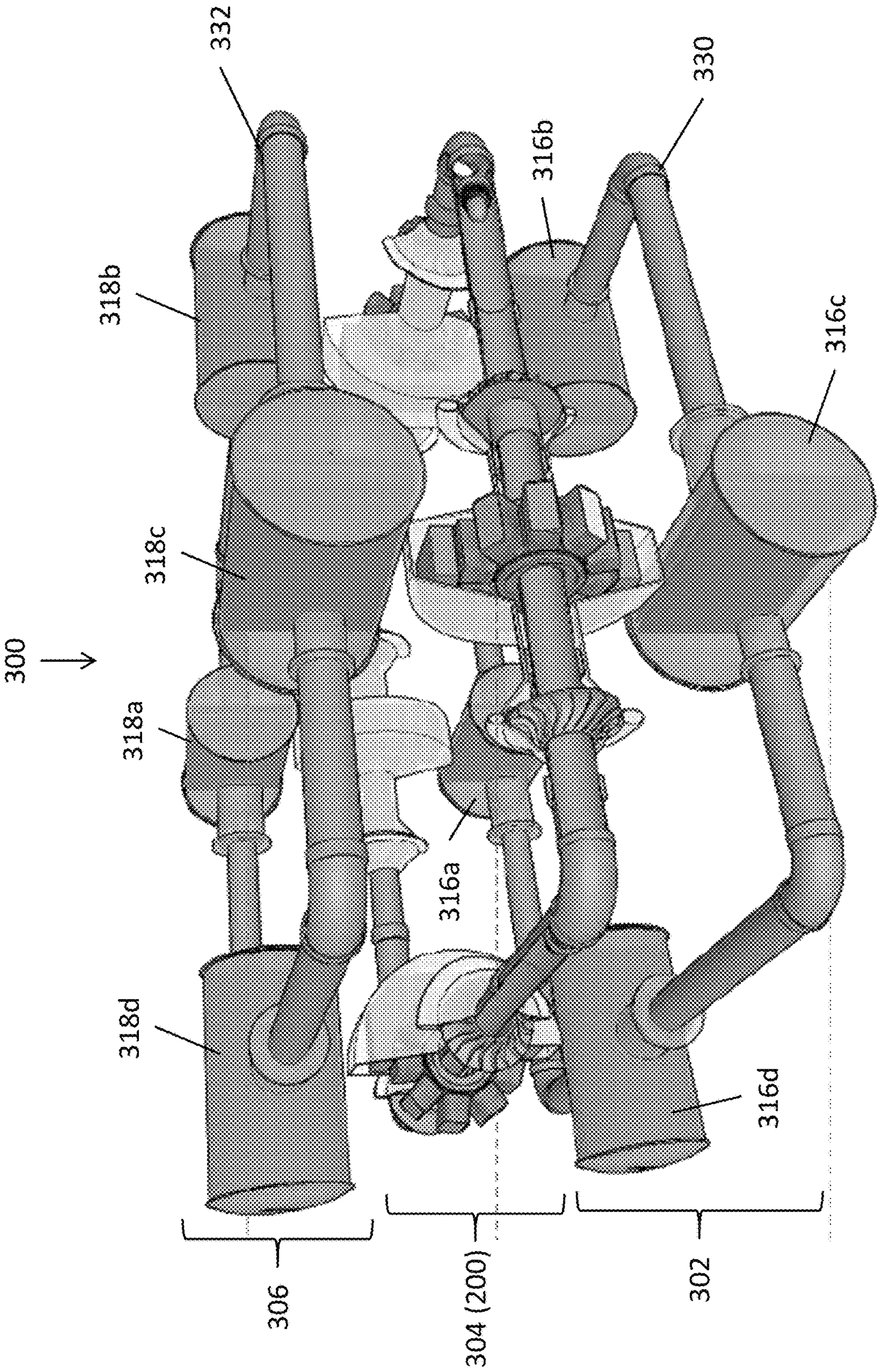
FIG. 3A depicts an isometric view of an embodiment directed to a multi-level stacked system which includes the four-stage combined Brayton cycle engine and Stirling cycle engine of FIG. 2A, according to one or more embodiments described and illustrated herein.

It should be understood that the multi-level stacked system 300 shown in FIG. 3A is not fully assembled for simplicity in showing the three levels 302, 304, and 306. However, the full assembly progression is shown by the illustrations in FIG. 3B and the fully assembled multi-level stacked system 300 is shown in FIGS. 3D, 3E, and 3F.

Figure 3B:
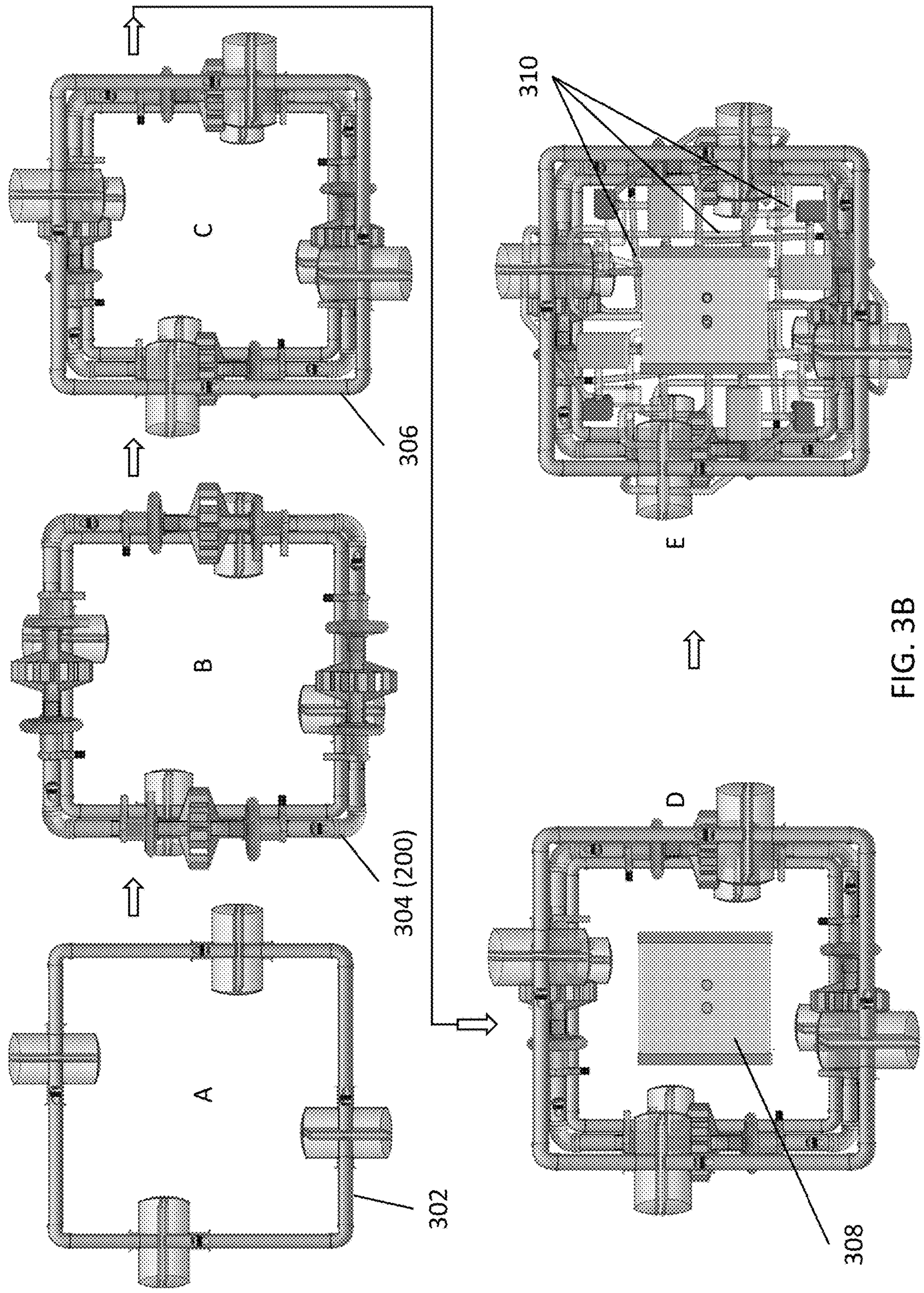
FIG. 3B depicts a top view of a full assembly progression of the multi-level stacked system of FIG. 3A.

Moving from left to right in FIG. 3B, picture A shows the addition of the bottom intercooling level 302. The bottom intercooling level 302 is the acoustic Stirling quad loop that provides both Brayton inter-stage cooling and electric power from that waste heat. Picture B adds the middle level 304 (e.g., staged Strayton system 200) on top of the bottom intercooling level 302. The middle level 304 generates electric power from the rotating Brayton generator and from the rotating bi-directional turbine acoustic Stirling generator. Picture C adds the top reheating level 306 on top of the middle level 304. The top reheating level 306 is the acoustic Stirling quad loop that supports both Brayton reheating and electric power generation from the waste heat used in the reheating stages. Picture D adds a centrally located recuperator 308. The recuperator 308 may include a single recuperator that supports the four Brayton cycles, a recuperator for recovering waste heat from other sources such as combustion, and a recuperator for preheating fuel prior to combustion. Finally, picture E interconnects the components of each layer 302, 304, and 306 with plumbing 310 for fuel, air, and the working fluid. The additional components illustrated in picture E will be discussed in further detail below.

The intercooling and reheating levels 302, 306 provide intercooling and reheating for the Brayton cycle components of the Strayton engines having the quad configuration in the middle level 304. In this regard, both the intercooling and reheating levels 302, 306 are similarly arranged in a quad configuration. A single recuperator 308 can thus be centrally located with respect to each of the bottom intercooling level 302, the quad configured Strayton engine middle level 304, and the top reheating level 306. Each level 302, 304, and 306, along with recuperator 308, are fluidically interconnected via plumbing 310.

Figure 3C:
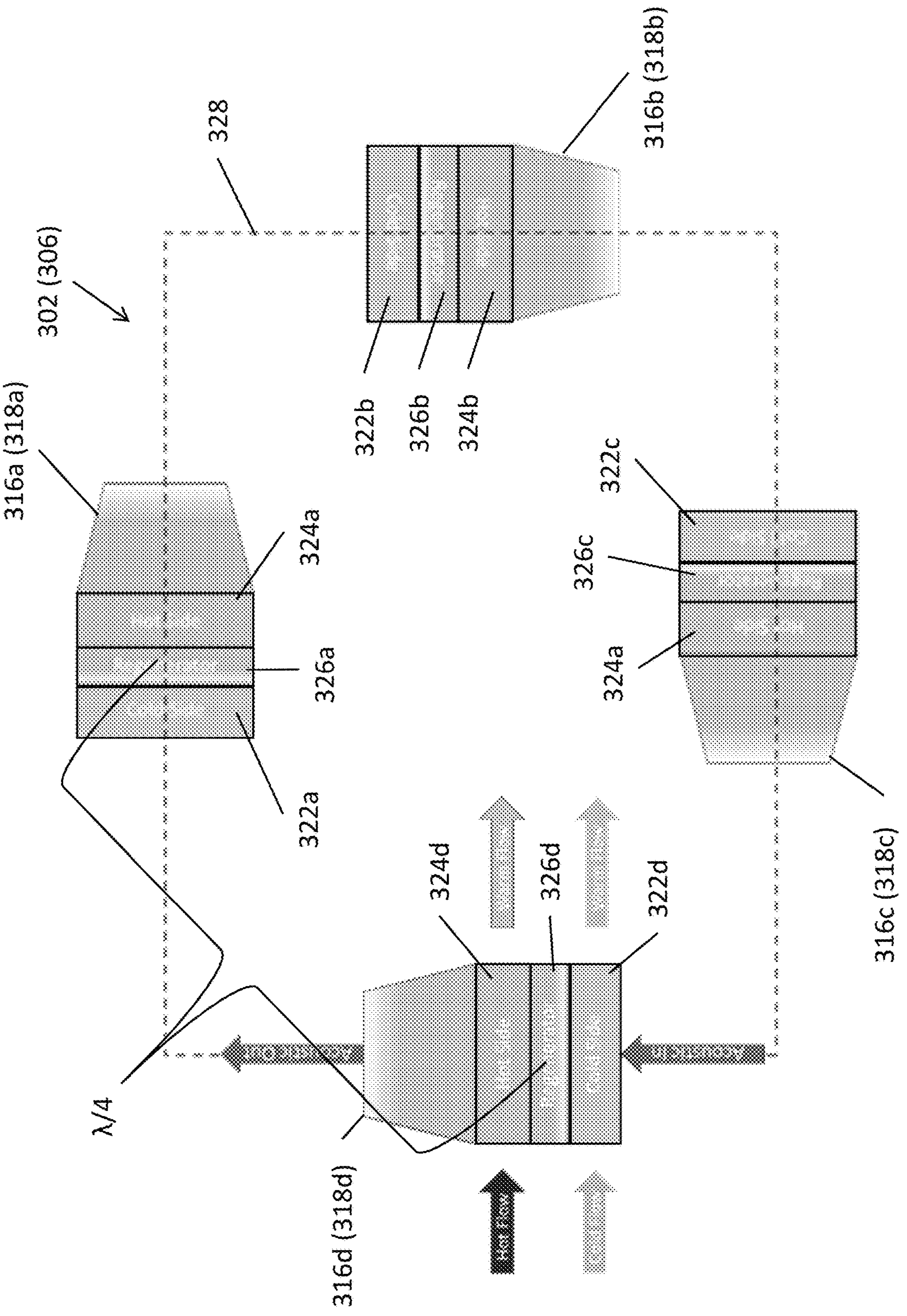
FIG. 3C depicts a schematic view of the top and bottom levels of the multi-level stacked system of FIG. 3A.
Figure 3D:
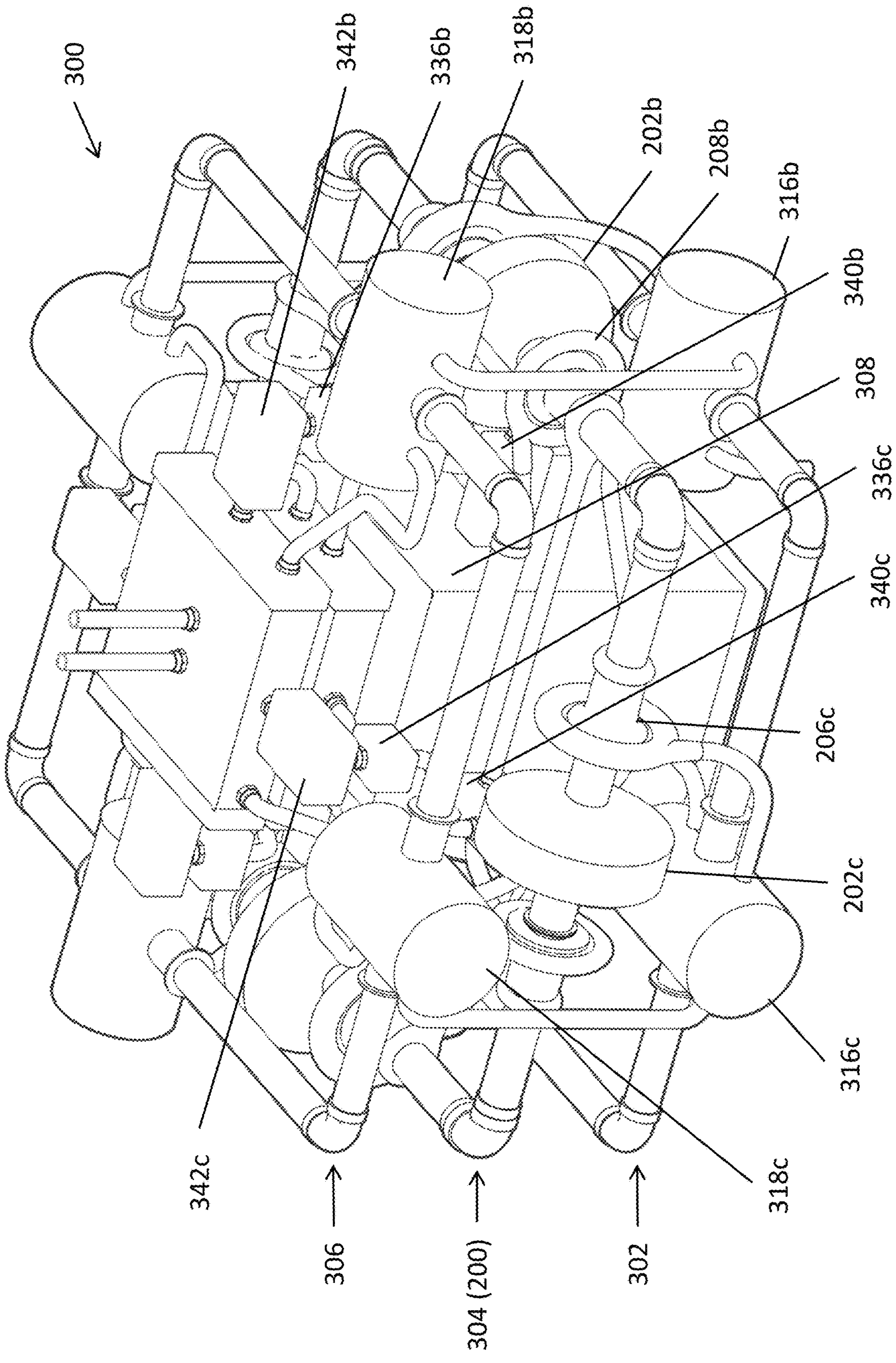
FIG. 3D depicts an isometric view of an embodiment directed to a fully assembled multi-level stacked system which includes the four-stage combined Brayton cycle engine and Stirling cycle engine of FIG. 2A, according to one or more embodiments described and illustrated herein.
Figure 3E:
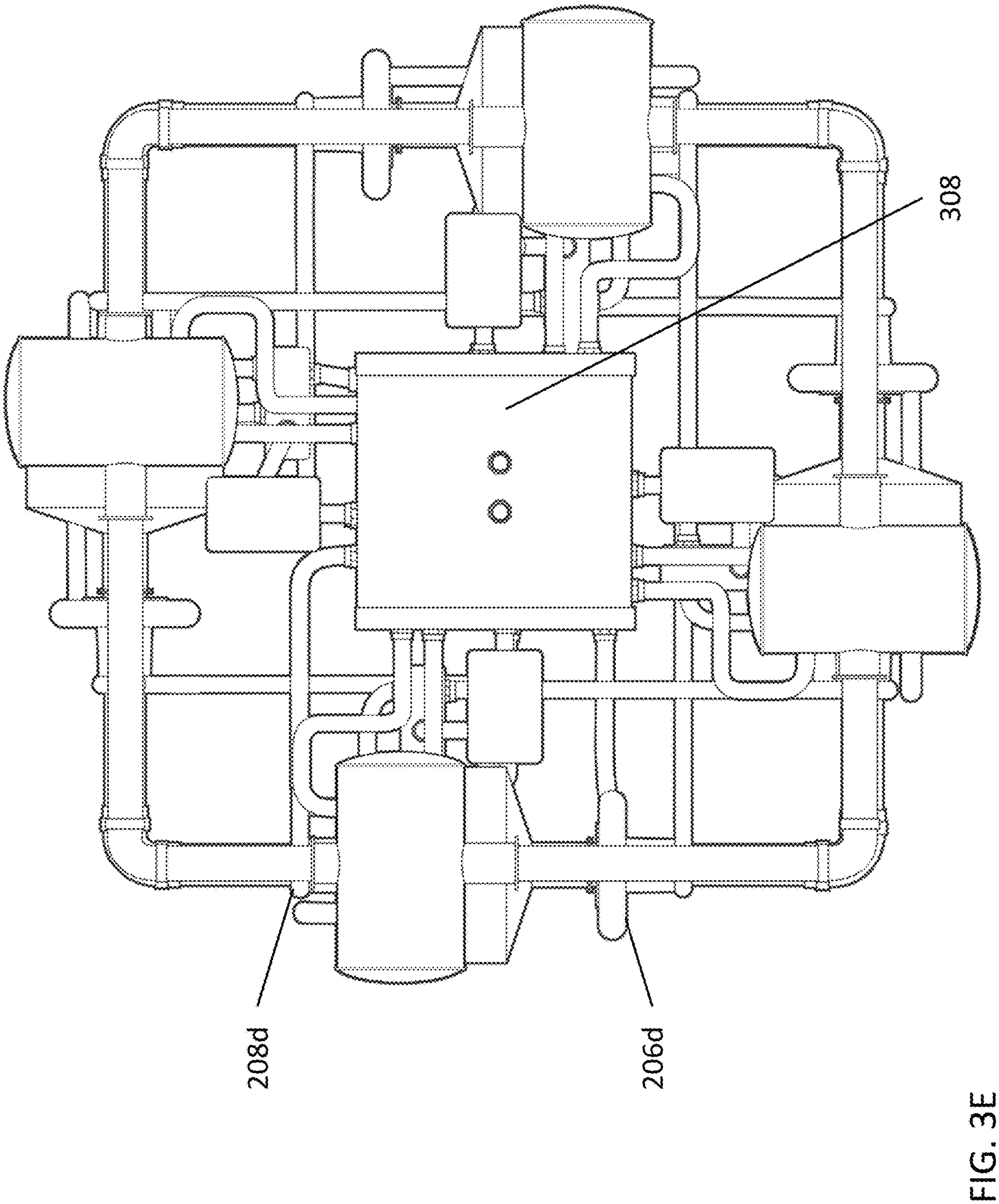
FIG. 3E depicts a top view of the fully assembled multi-level stacked system of FIG. 3D.
Figure 3F:
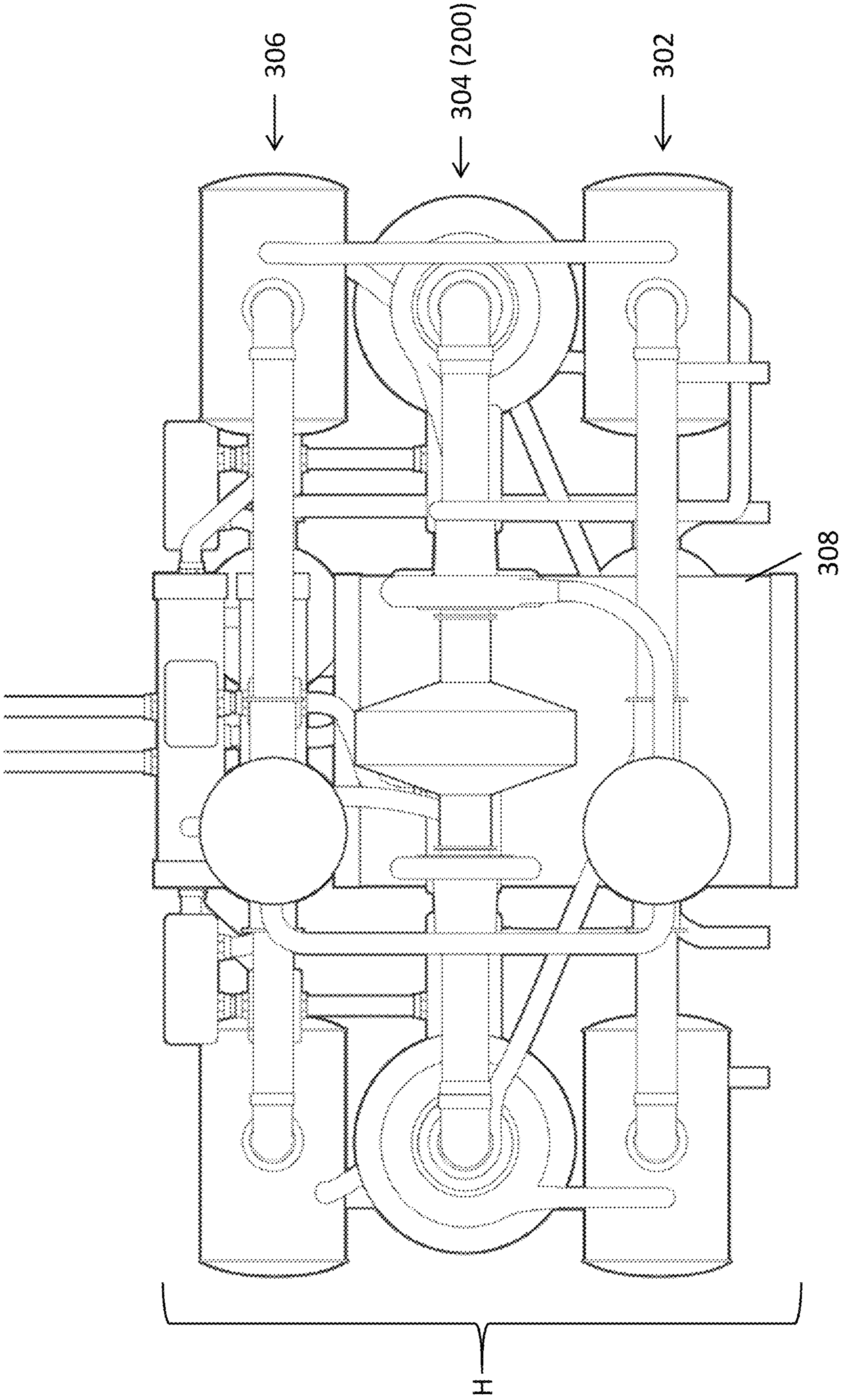
FIG. 3F depicts a back view of the fully assembled multi-level stacked system of FIG. 3D.

Additional details of the bottom intercooling level 302 and the top reheating level 306 will now be discussed with reference to FIGS. 3A and 3C. Generally, each of the bottom intercooling and top reheating levels 302, 306 include one acoustic heat exchanger for every Strayton cycle engine (i.e., Strayton cycle engines 202*a*-202*d* from FIGS. 2A and 2B). Thus, the bottom intercooling level 302 is generally made up of four acoustic heat exchangers 316*a*-316*d* interconnected by hollow tubing 330. Similarly, the top reheating level 304 is generally made up of four acoustic heat exchangers 318*a*-318*d* interconnected by hollow tubing 332.

It is noted that the bottom intercooling level heat exchangers 316*a*-316*d* provide intercooling for the corresponding Brayton cycle components (e.g., compressors 206*a*-206*d* from FIG. 2A) of the Strayton cycle engines in the middle level 304 (e.g., Strayton cycle engines 202*a*-202*d* from FIG. 2A). Similarly, the top reheating level heat exchangers 318*a*-318*d* provide reheating for the corresponding Brayton cycle components (e.g., turbines 208*a*-208*d* from FIG. 2A) of the Strayton cycle engines in the middle level 304 (e.g., Strayton cycle engines 202*a*-202*d* from FIG. 2A).

Each of the bottom intercooling level heat exchangers 316*a*-316*d* and top reheating level heat exchangers 318*a*-318*d* are similarly constructed. Thus, in FIG. 3C, only one of the levels is illustrated (e.g., bottom intercooling level 302). However, it should be understood that the bottom intercooling level heat exchangers 316*a*-316*d* have the same construction as the top reheating level heat exchangers 318*a*-318*d*. In particular, the heat exchangers 316*a*-316*d* of bottom intercooling level 302 (and the heat exchangers 318*a*-318*d* of top reheating level 306) each include a cold side heat exchanger 322*a*-322*d*, a hot side heat exchanger 324*a*-324*d*, and a regenerator 326*a*-326*d* disposed between the cold and hot side heat exchangers, respectively. In this regard, a portion of the hot input energy is converted to an acoustic wave and the remaining hot input energy is transferred to the cold side acoustically.

The four acoustic bottom intercooling level heat exchangers 316*a*-316*d* (and the four acoustic top reheating level heat exchangers 318*a*-318*d*) are arranged in a quad configuration wherein the heat exchangers are placed ¼ wavelength apart to form a self-amplifying loop 328. In other words, each acoustic bottom intercooling level heat exchangers 316*a*-316*d* (and each acoustic top reheating level heat exchangers 318*a*-318*d*) are placed acoustically 90 degrees apart, such that the distance the acoustic wave travels in the hollow tube is 25% of the total acoustic wavelength. The total length of the acoustic hollow tubing 330 (and hollow tubing 332) is equal to one wavelength of the acoustic wave in the Stirling cycle. The acoustic energy in the loop 328 can be used to generate electricity with a bi-directional turbine generator (not shown) disposed within hollow tubing 330 (and hollow tubing 332) and adjacent to one side of each acoustic heat exchanger 316*a*-316*d* (and one side of each acoustic heat exchanger 318*a*-318*d*). More particularly, the bi-directional turbine generators are generally disposed adjacent to the side of each acoustic heat exchanger 316*a*-316*d* (and each acoustic heat exchanger 318*a*-318*d*) where the hot side heat exchangers 324*a*-324*d* are disposed.

As discussed above, each of the bottom intercooling level 302, the middle Strayton cycle level 304, and the top reheating level 306 include four Stirling cycle engines which are placed 90 degrees apart in a quad configuration to form a loop within the respective hollow tubes 330, 230, and 332.

More particularly, the respective regenerators in each level 302, 304, and 306 are placed 90 degrees apart. The total perimeter length of each quad hollow tubing 330, 230, and 332 is equal to one wavelength of the acoustic wave traversing through the hollow tubing 330, 230, and 332. So with a 90-degree separation, it should be understood that the acoustic wave has traveled 25% of this total wavelength. The wavelength is a function of the frequency and wave speed. The frequency is chosen (about 60 Hz in some embodiments) and the wave speed is a function of the temperature and working fluid used. Thus, for example, assuming a wave speed of 300 m/s and a frequency of 60 Hz, the total wavelength would be 5 m. The distance between each Stirling regenerator in this case would be 25% of 5 m or 5/4 m, which is the distance the sound wave travels in the hollow tubes 330, 230, and 332 for this example.

Turning now to FIG. 3D, the multi-level stacked system 300 is illustrated in its fully assembled form, with each level having the quad configuration as discussed above. In the fully assembled form, each level of system 300 has an acoustic Stirling loop with four, no-moving part acoustic engines. That is, an acoustic loop is formed in the bottom intercooling level 302 by the four heat exchangers 316*a*-316*d* arranged in a quad configuration, an acoustic loop is formed in the middle Strayton engine level 304 by the four acoustic Stirling engines embedded in the four Brayton cycle engines and arranged in a quad configuration, and an acoustic loop is formed in the top reheating level 306 by the four heat exchangers 318*a*-318*d* arranged in a quad configuration. The top and bottom levels 302, 306 generate electric power using the acoustic Stirling cycle only. The middle level 304 generates electric power using both the Brayton and acoustic Stirling cycles. In total, 16 engines are synergistically combined in the fully assembled, multi-level stacked system 300 (e.g., four Stirling engines in the bottom intercooling level, four embedded Stirling engines in the middle level, four Brayton engines in the middle level, and four Stirling engines in the top reheating level).

As briefly described above, intercooling is provided for each compressor 206*a*-206*d* of the four Strayton engines 202*a*-202*d* in the middle level 304 and reheating is provided for each turbine 208*a*-208*d* of the four Strayton engines 202*a*-202*d* in the middle level 304. In FIG. 3D, the intercooling and reheating operations will be described with reference to Strayton engines 202*b* and 202*c* for simplicity. However, it should be understood that intercooling and reheating with respect to engines 202*a* and 202*d* is substantially similar.

The intercooling is provided by the bottom intercooling level 302. In this regard, an inlet side of the compressor 206*c* is fluidically connected to the intercooling heat exchanger 316*b* of the immediately preceding stage and an outlet side of the compressor 206*c* is fluidically connected to the intercooling heat exchanger 316*c* of the corresponding stage which is disposed below the compressor 206*c*. The reheating is provided by the top reheating level 306. In this regard, an inlet side of the turbine 208*b* is fluidically connected to the corresponding hot heat exchanger 340*b* disposed behind the turbine 208*b* and an outlet side of the turbine 208*b* is fluidically connected to the hot heat exchanger 340*c* of the immediately subsequent stage. It should be understood that while the connections for intercooling and reheating discussed above are directed to two of the four Strayton stages, the remaining two Strayton stages are connected in a substantially similar manner.

Moreover, in some embodiments, the multi-level stacked system 300 is a closed system that can be coupled with a separate propulsion generating hydrogen combustion system to provide zero-emission electric power (discussed in further detail below). In this regard, additional components are included with the multi-level stacked system 300 to provide the zero-emission electric power. These components include hot heat exchangers 340*b*, 340*c* and steam mixers 342*b*, 342*c*. Both the hot heat exchangers 340*b*, 340*c* and steam mixers 342*b*, 342*c* are fluidically connected to the combustors 336*b*, 336*c*, respectively. It is noted that through the use of combustors 336*b*, 336*c*, the combustion exhaust can be separated from the turbines of the middle level 304. Steam mixers 342*b*, 342*c* are further connected to the recuperator 308. In addition, the hot heat exchangers 340*b*, 340*c* are fluidically connected to the turbines 208*b*, 208*c* and to the reheating heat exchangers 318*b*, 318*c*. It should be understood that while the multi-level stacked system 300 of FIG. 3D includes combustion system components (e.g., combustors 336*b*, 336*c*), some embodiments would not use combustors for providing heat. In such embodiments, nuclear or solar heat sources could be used that would not use a combustor for providing heat. As such, multi-level stacked system 300 works with any heat source.

With reference to FIG. 3E, the multi-level stacked system 300 is illustrated in its fully assembled form. It should be noted that the outlet side of one compressor (e.g., compressor 206*d*) of the four Strayton engines 202*a*-202*d* in the middle level 304 is fluidically connected to the recuperator 308. Additionally, the outlet side of one turbine (e.g., turbine 208*d*) of the four Strayton engines 202*a*-202*d* in the middle level 304 is fluidically connected to the recuperator 308. The recuperator 308 is centrally located for easy fluidic connections with the Brayton cycles of the middle level 304.

Turning now to FIG. 3F, the multi-level stacked system 300 is again illustrated in its fully assembled form. FIG. 3F illustrates the compact nature of the multi-level stacked system 300. Thus, in some embodiments, a total height H of the combined four stage engine of the middle level 304, the four-stage intercooling level 302, the four-stage reheating level 306, and the recuperator 308 is about 4 feet.

Figure 4:
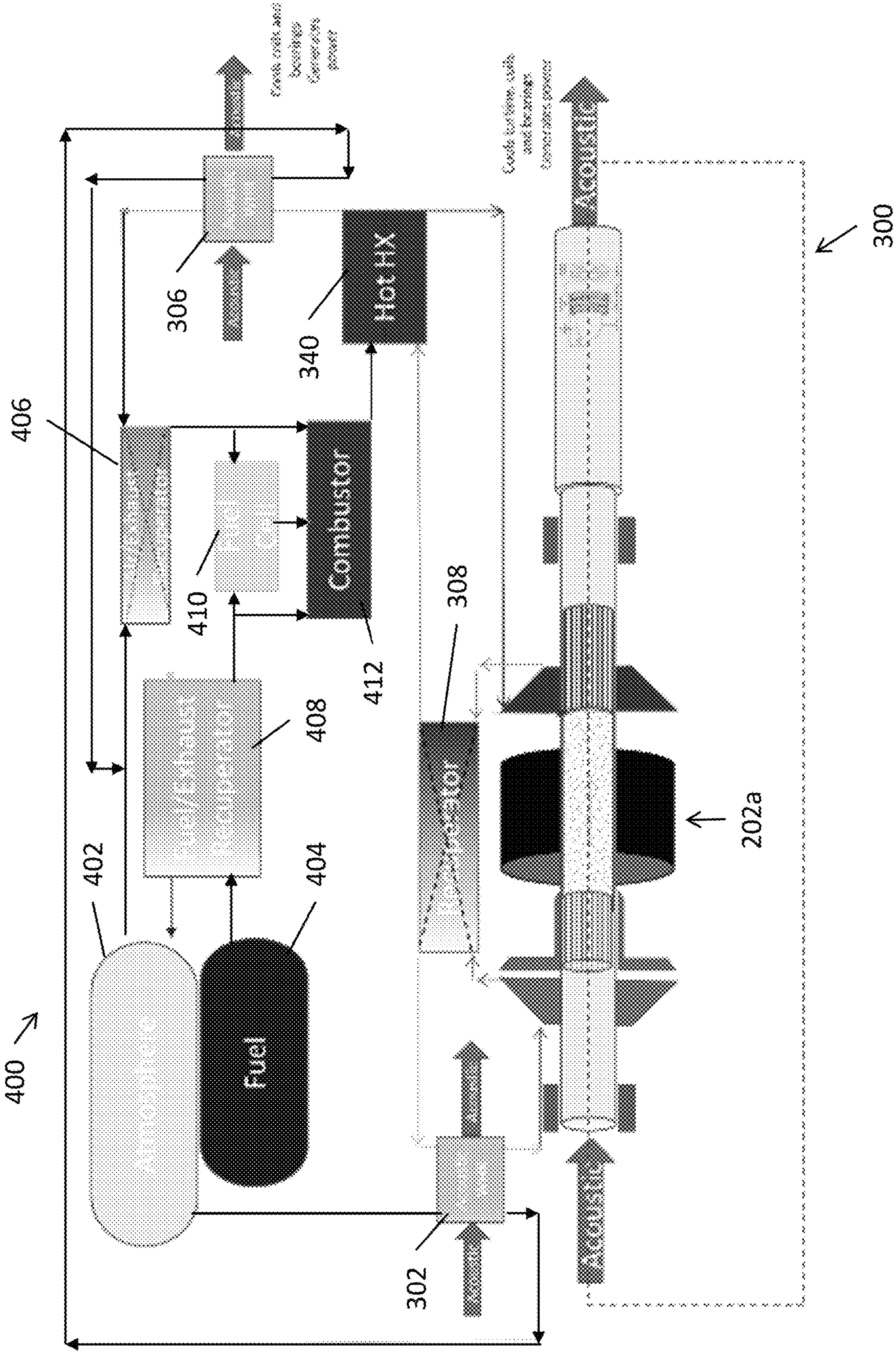
FIG. 4 depicts a schematic view of an embodiment directed to the multi-level stacked system of FIG. 3D coupled with a separate propulsion generating system to provide zero-emission electric power, according to one or more embodiments described and illustrated herein.

Referring now to FIG. 4, it should be understood that only a single Strayton engine 202*a* is shown for simplicity. However, the single Strayton engine 202*a* shown in FIG. 4 is representative of the multi-level stacked system 300 as illustrated in FIGS. 3A-3F. FIG. 4 also shows the bottom intercooling level 302, top reheating level 306, recuperator 308, and hot heat exchangers 340 of the multi-level stacked system 300. In some embodiments, the multi-level stacked system 300 having the quad configuration of Strayton engines (only Strayton engine 202*a* is illustrated here) is coupled with a separate propulsion generating hydrogen combustion system 400 to provide zero-emission electric power. The hydrogen combustion system 400 is generally made up of an air source 402 (e.g., atmosphere), fuel source 404 ($LH_2$), air/exhaust recuperator 406, fuel/exhaust recuperator 408, mixer 410, and combustor 412. The quad configuration of Strayton engines in system 200 can provide zero-emission electric power through the use of mixer 410 to mix steam with the hydrogen combustion from combustor 412. In some embodiments, the mixer 410 can be a fuel cell. In other embodiments, the mixer 410 can be an exhaust collection steam mixer, where the steam comes from the exhaust itself when burning hydrogen. A steam mixer may be used in place of a fuel cell to achieve longer life in the combustion system.

In this manner, the separation of the multi-level stacked system 300 from the combustion system 400 enables both pre- and post-emission control for achieving zero greenhouse gas emissions. Post-emission control can be achieved since the combustion exhaust is not used for propulsion. Moreover, the separation of power generation by the multi-level stacked system 300 from electric motor propulsion by the hydrogen combustion system 400 allows the use of contra-rotating fan configurations. As a result, the thermodynamic and propulsive efficiency are simultaneously improved and greenhouse gas emissions are eliminated.

In the embodiment illustrated in FIG. 4, the closed multi-level stacked system 300 coupled with the separate propulsion generating hydrogen combustion system 400 generates high frequency 3-phase AC power. Due to the closed cycle operation, an efficiency of about 60% for the multi-level stacked system 300 can be achieved with a combustion temperature of lower than 1000° C. to eliminate NOx. Additionally, the exhaust water vapor is too cool to produce any contrails. Thus, true zero aviation emission can be achieved with $LH_2$ fuel. The embedded Stirling cycles cool turbine blades by conductively absorbing heat and recuperating working fluid via rotating heat exchangers. As a result, the use of separate recuperators as in traditional closed Brayton cycle engines is not required and weight is reduced by approximately half. This increases the specific power of the Strayton engine to 8 kW/kg. The fuel cell/steam mixer is rated at less than 5% of the total engine power, to produce steam and reduce oxygen concentration in the hydrogen combustor for NOx reduction. As the "byproducts", DC power output can power the non-propulsion-related electric loads and the largely reduced waste heat from the fuel cell/steam mixer can also be used to warm the fuel prior to combustion.

Figure 5:
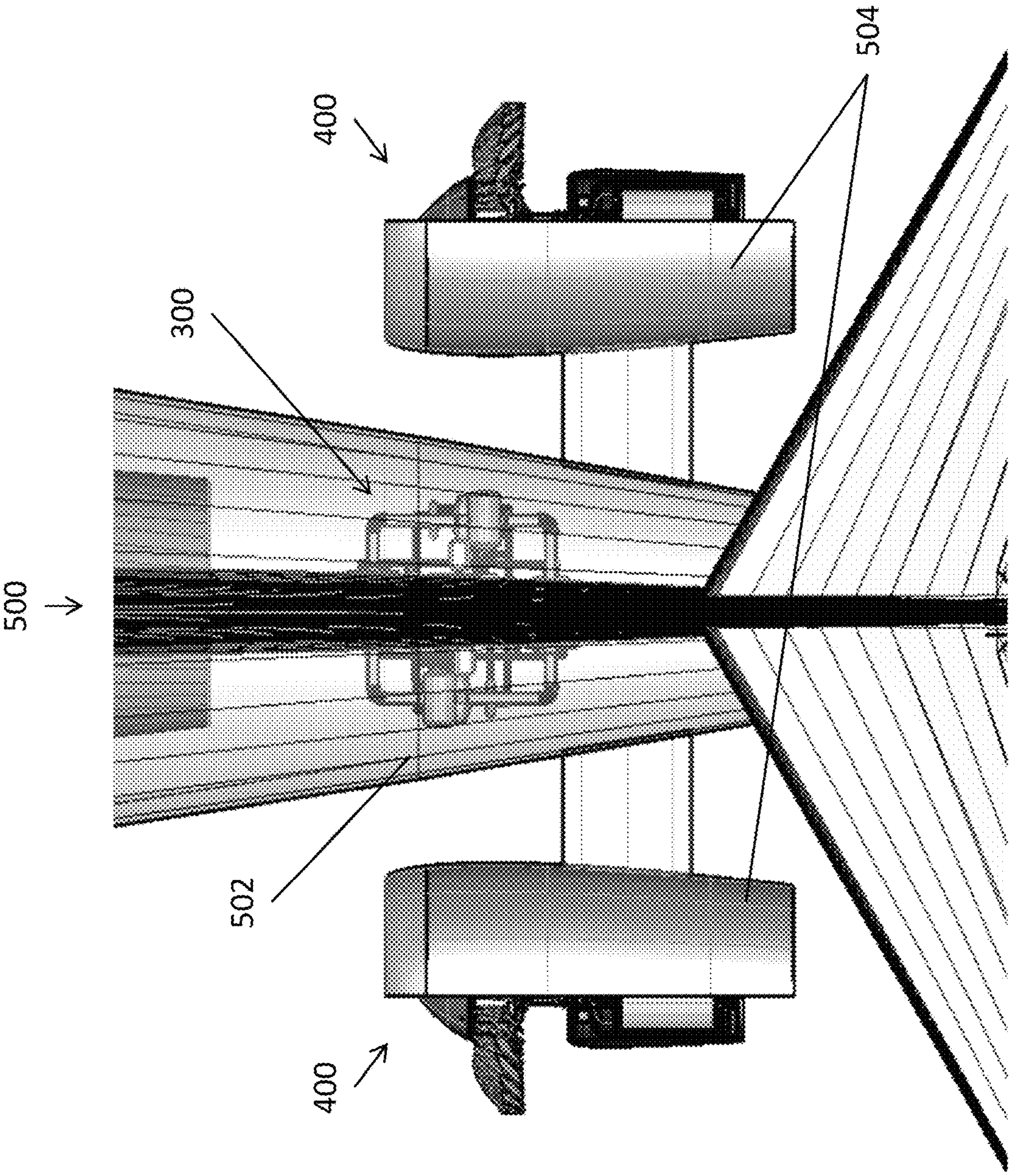
FIG. 5 depicts a top view of an embodiment directed to an aircraft having the multi-level stacked system installed in the aircraft fuselage which generates clean power for the separate electric motor propulsion installed in the nacelles of the aircraft, according to one or more embodiments described and illustrated herein; and, FIG. 6 depicts a schematic view of an embodiment directed to the multi-level stacked system of FIG. 3D being configured in an open cycle configuration where the working fluid is atmospheric air instead of a pressurized inert working fluid, according to one or more embodiments described and illustrated herein.

Turning now to FIG. 5, the separation of power generation by the multi-level stacked system 300 from electric motor propulsion by the hydrogen combustion system 400 is further illustrated. In this regard, in some embodiments, the multi-level stacked system 300 is installed in the tail-cone 502 of an aircraft 500 to generate electric power. However, it should be understood that the multi-level stacked system 300 could be installed in another location of the fuselage of the aircraft 500 as desired. The hydrogen combustion system is installed in the nacelles 504 of aircraft 500 to provide electric motor propulsion.

Figure 6:
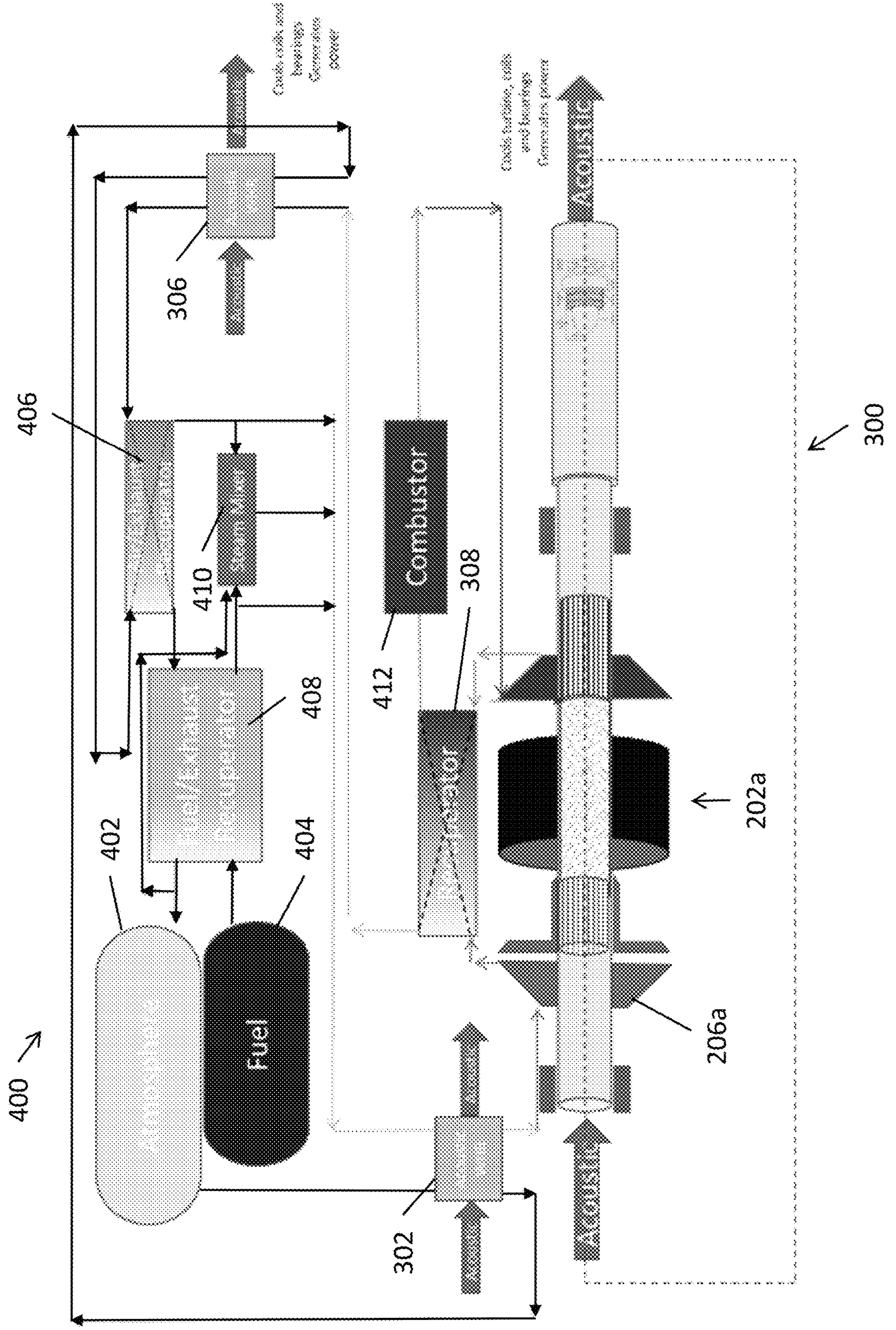

The previously described closed configurations can also be converted to an open cycle where the working fluid is atmospheric air instead of a pressurized inert working fluid. Such an open cycle is schematically illustrated in FIG. 6. It should be understood that only a single Strayton engine 202*a* is shown for simplicity. However, the single Strayton engine 202*a* shown in FIG. 5 is representative of the multi-level stacked system 300 as illustrated in FIGS. 3A-3F. FIG. 5 also shows the bottom intercooling level 302, top reheating level 306, and recuperator 308 of the multi-level stacked system 300. FIG. 5 further shows the separate propulsion generating hydrogen combustion system 400 from FIG. 4, which includes air source 402 (i.e., atmosphere), fuel source 404 ($LH_2$), air/exhaust recuperator 406, fuel/exhaust recuperator 408, mixer 410, and combustor 412. It is noted that the hot heat exchangers 340 from the closed cycle illustrated in FIG. 4 are not required in the open cycle of FIG. 5, where external air is delivered through both the combustor 412 and turbomachinery (e.g., compressor 206*a*) as is typical with turbofans.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system comprising:

a Brayton cycle engine that includes a compressor, a turbine, a hollow rotating shaft that extends between a first end and a second end, a hollow tubing that interconnects the first end and the second end, and a heat source;

a thermoacoustic Stirling cycle engine disposed within the hollow rotating shaft between the first and second ends thereof, the Stirling cycle engine including, a cold side heat exchanger disposed adjacent to the compressor, a hot side heat exchanger disposed adjacent to the turbine, and a regenerator disposed between the cold and hot side heat exchangers;

a first power generator disposed within the hollow tubing and located adjacent to the second end of the hollow rotating shaft; and, a second power generator disposed around the hollow rotating shaft between the first and second ends thereof.

2. The system of claim 1, wherein the hot side heat exchanger receives heat generated by the turbine to thereby power the Stirling cycle engine.

3. The system of claim 1, wherein the cold side heat exchanger receives waste heat generated by the thermoacoustic Stirling cycle engine and introduces the waste heat before the heat source of the Brayton cycle engine.

4. The system of claim 1, wherein the system is hermetically sealed and includes a pressurized working fluid shared between the Brayton cycle engine and the Stirling cycle engine.

5. The system of claim 4, wherein the pressurized working fluid is a noble gas.

6. The system of claim 5, wherein the noble gas is selected from He—Xe, He—Ar, or He—$N_2$.

7. The system of claim 1, wherein the hollow rotating shaft and the first power generator are supported by one or more pressurized gas bearings.

8. The system of claim 1, wherein the first power generator is a bi-directional turbine.

9. The system of claim 1, wherein the second power generator is a switched reluctance generator.

10. A system comprising:

a four-stage engine, wherein each stage is interconnected by a first hollow tubing and each stage comprises:

a Brayton cycle engine that includes a compressor, a turbine, a hollow rotating shaft that extends between a first end and a second end, and a heat source;

a thermoacoustic Stirling cycle engine disposed within the hollow rotating shaft between the first and second ends thereof, the Stirling cycle engine including a cold side heat exchanger disposed adjacent to the compressor, a hot side heat exchanger disposed adjacent to the turbine, and a regenerator disposed between the cold and hot side heat exchangers;

a first power generator disposed within the first hollow tubing and located adjacent to the second end of the hollow rotating shaft; and, a second power generator disposed around the hollow rotating shaft between the first and second ends thereof.

11. The system of claim 10, wherein each thermoacoustic Stirling cycle engine of the four-stage engine is arranged approximately 90 degrees apart from an adjacent thermoacoustic Stirling cycle engine.

12. The system of claim 10, further comprising a recuperator fluidically connected to the four-stage engine, the recuperator being centrally located with respect to each stage.

13. The system of claim 10, further comprising an intercooling stage disposed under the four-stage engine that includes four acoustic heat exchangers, each acoustic heat exchanger being arranged approximately 90 degrees apart from an adjacent acoustic heat exchanger, and each acoustic heat exchanger being interconnected by a second hollow tubing, wherein the intercooling stage is fluidically connected to the four-stage engine.

14. The system of claim 13, further comprising a bi-directional turbine generator disposed within the second hollow tubing and located adjacent to one side of each acoustic heat exchanger.

15. The system of claim 10, further comprising a reheating stage disposed above the four-stage engine that includes four acoustic heat exchangers, each acoustic heat exchanger being arranged approximately 90 degrees apart from an adjacent acoustic heat exchanger, and each acoustic heat exchanger being interconnected by a third hollow tubing, wherein the reheating stage is fluidically connected to the four-stage engine.

16. The system of claim 15, further comprising a bi-directional turbine generator disposed within the third hollow tubing and located adjacent to one side of each acoustic heat exchanger.

17. A system comprising:

a four-stage engine, wherein a first hollow tubing connects each stage, and each stage is arranged substantially 90 degrees apart from an adjacent stage, each stage comprising:

a Brayton cycle engine that includes a compressor, a turbine, a hollow rotating shaft that extends between a first end and a second end, and a heat source;

a thermoacoustic Stirling cycle engine disposed within the hollow rotating shaft between the first and second ends thereof, the Stirling cycle engine including a cold side heat exchanger disposed adjacent to the compressor, a hot side heat exchanger disposed adjacent to the turbine, and a regenerator disposed between the cold and hot side heat exchangers;

a first power generator disposed within the first hollow tubing and located adjacent to the second end of the hollow rotating shaft; and, a second power generator disposed around the hollow rotating shaft between the first and second ends thereof;

a four-stage intercooling level fluidically connected to and disposed under the four-stage engine, each stage comprising an intercooling acoustic heat exchanger being arranged 90 degrees apart from an intercooling acoustic heat exchanger of an adjacent stage, and each stage being interconnected by a second hollow tubing;

a four-stage reheating level fluidically connected to and disposed above the four-stage engine, each stage comprising a reheating acoustic heat exchanger being arranged 90 degrees apart from a reheating acoustic heat exchanger of an adjacent stage, and each stage being connected by a third hollow tubing; and, a recuperator centrally located with respect to the four-stage engine, the four-stage intercooling level, and the four-stage reheating level.

18. The system of claim 17, wherein a height of the system including the four-stage engine, the four-stage intercooling level, the four-stage reheating level, and the recuperator is about 4 feet.

19. The system of claim 17, wherein the system has an efficiency of about 60% and a specific power of about 8 kW/kg.

20. The system of claim 17, wherein the system including the four-stage engine, the four-stage intercooling level, the four-stage reheating level, and the recuperator is installed in a fuselage of an aircraft.

* * * * *